Figure 1:
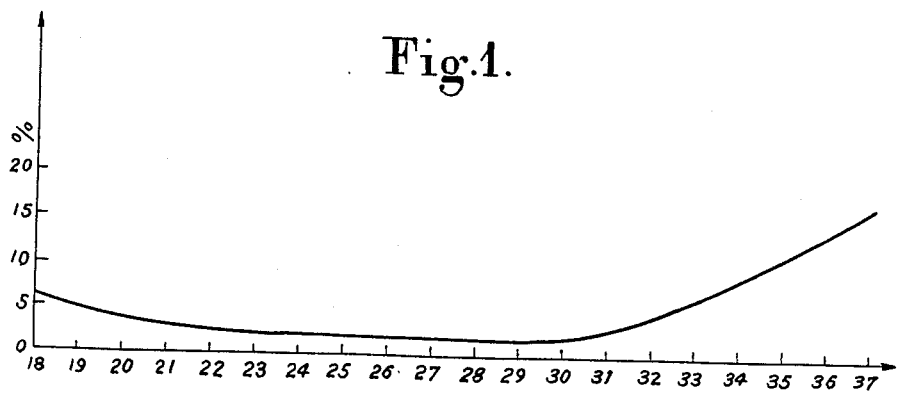

United States Patent [19]

Claverie

[11] 4,102,695

[45] Jul. 25, 1978

[54] REFRACTORY COMPOSITIONS WITH CERAMIC AND HYDRAULIC SETTING

[75] Inventor: André Claverie, Abbeville, France

[73] Assignee: E.F.S.I. Establissements pour la Fabrication de Specialites Industrielles, Abbeville, France

[21] Appl. No.: 504,531

[22] Filed: Sep. 9, 1974

[30] Foreign Application Priority Data

Sep. 7, 1973 [FR] France .................. 73 32320

[51] Int. Cl.$^2$ .................. C04B 35/02
[52] U.S. Cl. .................. 106/64; 106/71; 106/89; 106/97; 106/104
[58] Field of Search .................. 106/64, 71, 89, 97, 106/104

[56] References Cited

U.S. PATENT DOCUMENTS

| | | | |
|---|---|---|---|
| 2,419,684 | 4/1947 | Johnson et al. | 106/64 |
| 3,179,524 | 4/1965 | Hunter | 106/71 |
| 3,181,959 | 5/1965 | Raine et al. | 106/64 |
| 3,802,894 | 4/1974 | Prost et al. | 106/64 |

*Primary Examiner*—Patrick P. Garvin
*Assistant Examiner*—John P. Sheehan

[57] ABSTRACT

This refractory composition is of the type comprising refractory aggregates, aluminous cements and additives.

80 to 94% of a mixture of 39 parts of aggregates of 2 to 5 mm, 30 parts of aggregates of 0.2 to 2 mm and 20 parts of aggregates of 50 $\mu$ to 0.2 mm has the following added to it:

(a) 4 to 12 parts by weight of an aluminous hydraulic cement;
(b) 2 to 8 parts by weight of a refractory material of grain size less than 50 microns, having a large specific surface and a high water-adsorption capacity;
(c) 0.01 to 0.6 parts by weight of a deflocculating and/or fluidizing agent for the above-mentioned material;
(d) 0.01 to 0.6 parts by weight of a binder capable of increasing the hot and cold physico-mechanical characteristics of the products obtained from this composition and capable of giving rise to a retarding effect on the hydraulic setting of the aluminous cement.

3 Claims, 3 Drawing Figures

REFRACTORY COMPOSITIONS WITH CERAMIC AND HYDRAULIC SETTING

This invention, which was developed with the assistance of Monsieur DELARUE, relates to novel refractory compositions with ceramic and hydraulic setting and having as basic constituents refractory aggregates and aluminous cement associated with different additives, each imparting individual properties, and to their method of preparation.

It is already known, for example from the French Pat. Nos. 1 284 816 and 1 326 874, to prepare mouldable refractory products, in particular for blast furnaces, essentially consisting of about 55 to 90% of a heat-proof aggregate, for example a chromium ore, calcined alumina, a calcined bauxite, calcined kyanite, silicon carbide etc., about 9 to 40% of a heat-proof cement, such as a calcium aluminate cement, about 1 to 5% of a refractory material with a grain size of about 10 microns, such as amorphous silica, and to mix all of this with about 8% water only.

It has likewise been proposed to add to mixtures composed of 70 to 90% refractory aggregates and 10 to 30% of aluminous cement, 0.1 to 2% clay, a plasticizer such as bentonite and 0.01 to 0.6%, in relation to clay, of a surface-active substance acting as a deflocculant.

It has been ascertained that to obtain a high-quality refractory composition with hydraulic and ceramic setting it is necessary to keep to very precise proportions, from which one cannot deviate without detracting from the quality of the material, for each of the constituents, i.e. the refractory aggregate, the hydraulic cement and the refractory material of small grain size.

In accordance with this invention these compositions have at the same time the following characteristics:

(1) The mixture of refractory aggregates, of determined grain size, comprises the following proportions:
- about 39 parts by weight of a refractory aggregate of 2 to 5 mm,
- about 30 parts by weight of a refractory aggregate of 0.2 to 2 mm,
- about 20 parts by weight of a refractory aggregate of 50 microns to 0.2 mm.

(2) 80 to 94 parts by weight of the preceding mixture have added thereto:
(a) 4 to 12 parts by weight of an aluminous, hydraulic cement,
(b) 2 to 8 parts by weight of a refractory material of grain size less than 50 microns, having a large specific surface and high water-adsorption capacity,
(c) 0.01 to 0.6 parts by weight of a deflocculating and fluidizing agent for the preceding material,
(d) 0.01 to 0.6 parts by weight of a binder capable of increasing the hot and cold physico-mechanical characteristics of the products obtained from this composition, and capable of giving rise to the effect of slowing down the hydraulic setting of the aluminous cement.

The method according to the invention lies in the preparation of the above mixture with a minimum of water (3 to 8%), while retaining good workability, a suitable cement/water ratio and a rapid placement at the vibrating needle.

The refractory aggregates have a granulometric curve spread over sieves 18 to 37 of the standard NF X 11-01.

According to the invention, it is possible to use grain sizes other than that indicated above but established according to the same principle with aggregates whose size may reach 25 mm. These curves are plotted depending on the requirements of the material: thickness, mechanical strengths (compression, abrasion) resistance to heat etc.

The "rejects" from these different sieves are used to prepare the mixture of aggregates according to the invention.

This curve may be represented as illustrated in FIG. 1 of the accompanying drawing, in which the sieve sizes are the abscissae and the % of rejects in g. are the ordinates.

In the following there are indicated a number of substances coming under the compositions defined above.

(1) The refractory aggregates which can be used according to the invention are: chromium ore, mullite, sillimanite, m kyanite, forsterite, olivine, magnesia, argillaceous sands, calcined refractory clays, chamottes (fire-clays), bauxite, corundum, tabular alumina, zirconium and their homologues etc.

(2a) Aluminous hydraulic cements are used in the proportion of 4 to 12 parts by weight. These cements may be: the products designated "Fondu", "Secar" etc., as well as Standard and Super Rollandshutte etc., Alcoa CA 25 etc.

The small amount of cement used brings with it at a minimum 1% and at maximum 3.5% calcium oxide.

This oxide is a necessary contribution to certain reactions according to the compositions of the invention, however, it would be detrimental if present in excess.

These cements with calcium oxide are neither fluidized nor deflocculated by the aforementioned deflocculating agent.

(2b) The refractory material having a large specific surface and with high water-adsorption capacity is principally a clay, of the kaolinite type, having a low exchange capacity for bases; it is used in a proportion of 2 to 8 parts by weight.

A pure kaolinite will be chosen of the ($OH^-$ — $H^+$) type in an ionic atmosphere, i.e. on the Gouy-Freundlich diffuse double layer composed on $OH^-$ ions, fixed on the clay particle and with $H^+$ ions, and can be located inside or outside the micelle.

In a particle suspension, said particles are subjected to opposing forces:
(1) The particles are repelled since they are all negatively charged ($OH^-$);
(2) They are subjected to Van der Waals-type forces of attraction.

Consequently, it is necessary to find a way of increasing the repelling forces, in order to obtain a deflocculated suspension.

If a suitable sodium salt (ionically dissociated in the aqueous medium) is added, then the $Na^+$ ions penetrate into the ionic atmosphere and take the place of the $H^+$ ions, in accordance with the reaction:

$$- \text{clay} (OH^- - H^+) + (Na^+ - (R)^-) \rightarrow \text{clay}$$
$$(OH^- - Na^+) + H_2O$$

Each $H^+$ is converted into water but/each $Na^+$ there corresponds one $OH^-$ or a negatively charged, unconverted, radical. Consequently there is a concentration of $OH^-$ and/or a negatively charged radical, this gives rise to an electrostatic imbalance.

Firstly, there is produced a buffer effect by replacement of the H$^+$ ions by the Na$^+$ ions, however, when the base exchange capacity is saturated the pH value increases.

For a pH value of between 6 and 9.2 the viscosity decreases.

In fact, the Na$^+$ ions cause the repelling forces to increase, from this there results a reduction in the shearing forces and, consequently, in the viscosity.

Figure 2:
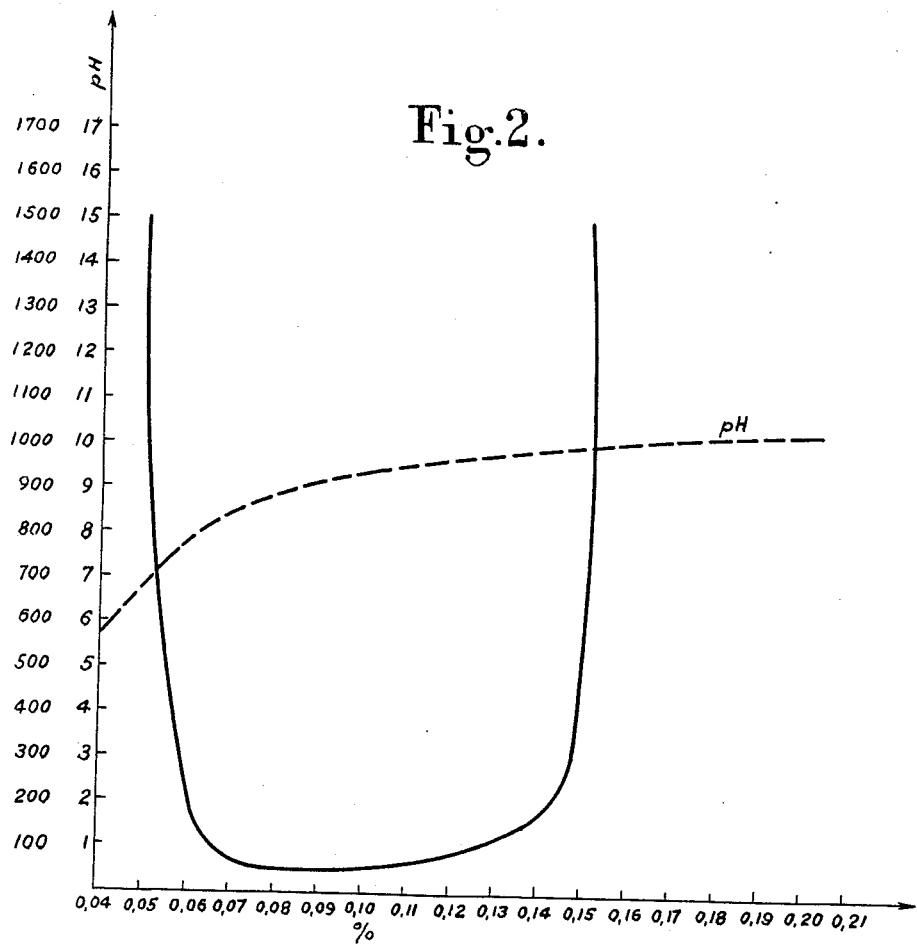

The viscosity curve as a function of the pH value passes through a minimum, at which the deflocculation is maximum and it is illustrated in FIG. 2 of the accompanying drawing, in which the % of deflocculation are the abscissae and the viscosities and pH value are the ordinates.

The refractory materials, which have large specific surface and high water-adsorption capacity, may likewise be:

micronized chamotte
kyanite
forsterite
magnesia
alumina etc.

Figure 3:
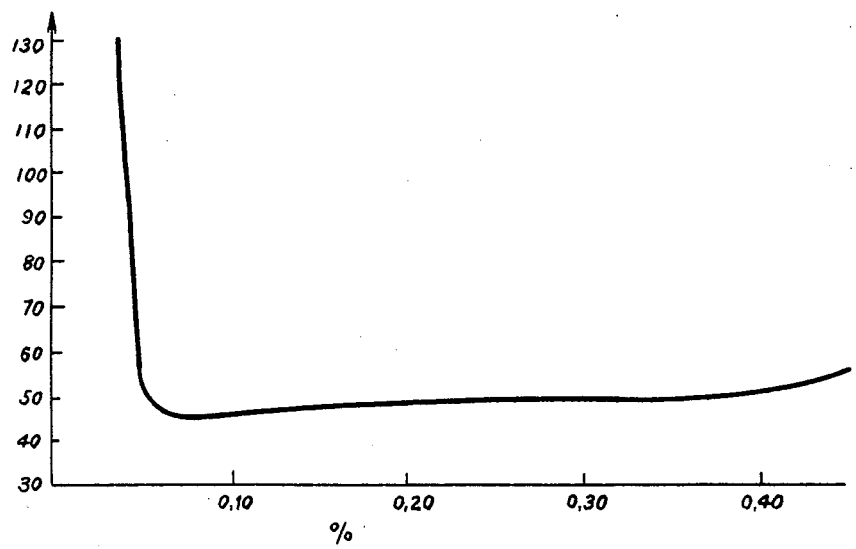

For guidance there is illustrated in FIG. 3 a viscosity graph of a micronized chamotte, the % of chamotte being plotted as abscissae and the viscosities in cps as ordinates.

(2c) It is possible to use (non-restrictively, by way of example) as fluidizing and/or deflocculating agent:

polymer phosphates, polyphosphates, carbonates, alkali, silicates etc., sold for example under the trade names GIESSFIX etc.

Such products, used in the proportion of 0.01 to 0.6%, are active in an aqueous medium whose pH value is between 6 and 9.2.

The viscosity of the clay is minimal for a pH value of 8.4.

If an aluminous cement is added to such a mixture, then the viscosity increases rapidly and this latter quickly becomes unusable.

In view of the high pH value of aluminous cements (the pH value can vary from 8 to 12) it is necessary:

1. to bring about a buffer effect thereon so as not to impede the deflocculation of the clay or of the refractory material having large specific surface.

2. to cause a retarding effect on the formation of the alumina gel of the cements, so as to permit the use of this composition.

(2d) these two effects are obtained by using, in a proportion of 0.01 to 0.6%, a binder with a neutral, or nearly neutral, polyphosphates base, sold for example under the trade names FFB 10 etc. FFB 10 is sodium hexametaphosphate.

The non-restrictive examples of compositions according to the invention are given below, by way of example:

| Constituents | Composition in accordance with invention | | |
|---|---|---|---|
| Chamotte 42/45 Al$_2$O$_3$ of 2 to 5 mm. | 38.60 | 39.50 | 39.50 |
| Chamotte 42/45 Al$_2$O$_3$ of 0.2 to 2 mm. | 29.00 | 29.65 | 29.65 |
| Chamotte 42/45 Al$_2$O$_3$ of 50 μ to 0.2 mm. | 19.40 | 19.85 | 19.85 |
| Fondu Lafarge | 7.00 | | |
| Secar 250 | | 7.00 | 5.00 |
| Clay <50 μ 42/45 Al$_2$O$_3$ | 6.00 | 4.00 | |
| Chamotte <50μ 42/45 Al$_2$O$_3$ | | | 6.00 |
| Giessfix Special (ZSCHIMMER & SCHWARTZ) | 0.0330 | 0.0217 | 0.012 |
| FFB 10 (PARKER) | 0.06 | 0.1 | 0.075 |
| Water | 8 | 8.0 | 8.00 |

Mean chemical and physico-mechanical characteristics of a refractory chamotte-based composition according to the invention.

| 1) Chemical analysis | |
|---|---|
| Al$_2$O$_3$ | 43 – 45 % |
| SiO$_2$ | 49 – 51 % |
| TiO$_2$ | 1.5 – 2 % |
| Fe$_2$O$_3$ | 1.5 – 2 % |
| CaO | 1.5 – 2 % |
| Alkalis | 21 1 % |

| 2) Physico-mechanical properties | |
|---|---|
| Pyroscopic resistance | 1780° C |
| Use limit temperature | 1560° C |
| Quantity of mixing water | 7.5 % by weight |
| Working time | 1 hour |
| Hardening time at 20° C | 5 hours |
| Subsequent variation in size temperature : 1560° C plateau : 5 hours rate : 100° C/hr | mean : − 0.12 |
| Porosity | 10 to 13% |
| Density | 2.20 |
| Compression (bars) - kiln at 100° C : | 150 to 250 |
| 650° C : | 400 to 600 |
| 1000° C : | 300 to 500 |
| 1350° C : | 500 to 700 |
| 1560° C : | 600 to 900 |

What is claimed as new is:

1. Moldable refractory composition for blast furnaces which consists of a mixture of 80 to 94 parts by weight of refractory aggregates having a granulometry of 50μ to 5 mm, 12 to 4 parts by weight of an aluminous hydraulic cement having a pH in the range of 8 to 12, 8 to 2 parts by weight of a refractory material of the kaolinite type having a granulometry lower than 50μ, 0.6 to 0.01 parts by weight of a substance capable of deflocculating and/or fluidizing kaolinite in an aqueous medium having a pH within the range of 6 to 9.2, and 0.6 to 0.01 parts by weight of a neutral or substantially neutral polyphosphate binder capable of retarding the hydraulic setting of the cement.

2. Refractory composition as set forth in claim 1, wherein said mixture of refractory aggregates comprises 39 parts by weight of a refractory aggregate having a granulometry of the order of 2 to 5 mm, 30 parts by weight of an aggregate having a granulometry of 0.2 to 2 mm, 20 parts by weight of an aggregate having a granulometry of 50μ to 0.2 mm.

3. Refractory composition as set forth in claim 1, wherein said deflocculating and/or fluidizing substance is an alkaline salt capable of releasing Na$^+$ ions in an aqueous mixture having a pH of 6 to 9.2.

* * * * *